(12) United States Patent
Yoshikawa et al.

(10) Patent No.: US 6,198,548 B1
(45) Date of Patent: Mar. 6, 2001

(54) COMMUNICATION TERMINAL DEVICE HAVING COPYING FUNCTION

(75) Inventors: Hiroyasu Yoshikawa, Kyotanabe; Taku Soneoka, Uji, both of (JP)

(73) Assignee: Murata Kikai Kabushiki Kaisha, Kyoto (JP)

( * ) Notice: Subject to any disclaimer, the term of this patent is extended or adjusted under 35 U.S.C. 154(b) by 0 days.

(21) Appl. No.: 09/047,071

(22) Filed: Mar. 24, 1998

(30) Foreign Application Priority Data

Mar. 26, 1997 (JP) .................................................. 9-073446

(51) Int. Cl.⁷ ................................................. H04N 1/04
(52) U.S. Cl. ......................... 358/498; 358/468; 358/401; 358/444
(58) Field of Search .................... 358/498, 496, 358/401, 296, 468, 400, 444, 404; 399/85, 86; 271/9.06

(56) References Cited

U.S. PATENT DOCUMENTS

| 4,809,050 | 2/1989 | Ito ........................................... 399/86 |
| 5,125,636 | 6/1992 | Higashio et al. ..................... 271/9.06 |
| 5,581,344 | 12/1996 | Makita .................................... 399/85 |
| 5,828,465 | * 10/1998 | Muramatsu et al. .................. 358/400 |
| 5,917,616 | * 6/1999 | Chou et al. ............................ 358/498 |

FOREIGN PATENT DOCUMENTS

| 0391632 | 10/1990 | (EP) . |
| 4255872 | 9/1992 | (JP) . |
| 6148990 | 5/1994 | (JP) . |
| 8009096 | 1/1996 | (JP) . |

* cited by examiner

Primary Examiner—Cheukfan Lee
(74) Attorney, Agent, or Firm—Hogan & Hartson, LLP.

(57) ABSTRACT

The copier-facsimile system including a recording unit for making a copy of an original or reproducing facsimile image data sent from a remote facsimile and a flap-type paper tray extending outward from a body of the communication terminal device when it is used such that a user can manually feed a recording sheet to the recording unit therefrom. The copier-facsimile system further includes an input key for inputting a first size of a recording sheet to be fed to the recording unit from the flap-type paper tray for printing facsimile image on the recording sheet and a second size of a recording sheet to be fed to the recording unit from the flap-type paper tray for making a copy. RAM stores the first size. The controller changes the recording sheet size setting of the recording unit to the first paper size from the second paper size upon completion of a copy operation if the first paper size is not equal to the second paper size and the copy operation has been carried out using the flap-type paper tray.

18 Claims, 5 Drawing Sheets

COMMUNICATION TERMINAL DEVICE HAVING COPYING FUNCTION

BACKGROUND OF THE INVENTION

1. Technical Field

The present invention relates to a communication terminal device having a copying function as well as a communication function (e.g., facsimile communication function) such as a copier-facsimile system.

2. Background Art

A certain type of communication terminal devices equipped with a reproducing function has not only one or more paper cassettes fitted in Its main body but also an additional flap-type paper tray which allows a user to pull it down from a lateral wall of the main body and load a sheet thereon for recording. The recording includes making a copy of an original and printing of facsimile data (image) sent from a remote facsimile. The recording paper is fed to a recording unit from either the paper cassettes or the flap-type paper tray. Since the flap-type paper tray projects outward from the lateral wall of the body of the communication terminal device and the recording sheet is placed thereon, the communication terminal device cannot detect the size of the recording sheet on the flap-type paper tray. Therefore, if a user wants to make a copy of a post card size original by supplying a recording sheet of the same size from the flap-type paper tray, the user must operate a control panel to enter or input the size of the recording sheet before pressing a copy start key. The copying is performed according to the paper size set by the user. After obtaining a copy of post card size, the user should then prepare for reception of facsimile data to be transmitted from a remote facsimile. In other words, the user needs to change the setting of paper size to, for instance, A4 and place A4 recording sheets on the flap-type paper tray in order to print facsimile data (image). A4 size is the most popular paper size for facsimile data communication.

Thus, the conventional communication terminal device is troublesome to operate if copying is carried out using the flap-type paper tray with a recording sheet of a size different from that for facsimile data reproduction since the user is required to reenter the paper size after copying. If the user forgets to change the paper size setting, the size of data received and that of the recording sheet may not match each other and data reception may be disabled.

SUMMARY OF THE INVENTION

The present invention intends to solve the above described problems of the conventional device.

An object of the present invention is to provide a communication terminal device having both a communication function and a copy function, which eliminates the above mentioned troublesome operation, i.e., manually changing (or reentering) the recording paper size each time the user wants to have facsimile data printed on a recording sheet supplied from a flap-type paper tray after making a copy using the flap-type paper tray.

Another object of the present invention is to provide a communication terminal device which warns a user that an appropriate recording sheet is not on the flap-type paper tray.

Still another object of the present invention is to provide a communication terminal device which does not allow a recording unit to make a copy or facsimile data reproduction until an inappropriate recording sheet on the flap-type paper tray is replaced with an appropriate one.

According to one aspect of the present invention, there is provided a communication terminal device having a communication function and a copy function and including a recording unit for making a copy of an original or reproducing facsimile image data sent from a remote facsimile, and a flap-type paper tray extending outward from a body of the communication terminal device when it is used such that a user can manually feed a recording sheet to the recording unit therefrom, characterized in that the communication terminal device further includes input means for inputting a first size of a recording sheet to be fed to the recording unit from the flap-type paper tray for reproducing facsimile data image and a second size of a recording sheet to be fed to the recording unit from the flap-type paper tray for making a copy, storage means for storing the first size of the recording sheet as input by the input means, and control means for changing the recording sheet size setting of the recording unit to the first paper size from the second paper size after completion of a copy operation if the copy operation has been carried out using the flap-type paper tray. The recording unit operates according to the paper size entered by the input means if a recording sheet is supplied to the recording unit from the flap-type paper tray. However, if the copying is carried out using the flap-type paper tray, the paper size setting of the recording unit is automatically returned to the first paper size upon completion of the copying. Therefore, the user does not have to change the paper size setting for facsimile data reception after making a copy using the flat tray. The recording unit is set to the first paper size setting at the beginning, and this setting is maintained until the second paper size is entered.

The flap-type paper tray may be retractable so that it forms part of a lateral wall of a main body of the communication terminal device or it may fixedly attach to the lateral wall of the communication terminal device.

The control means may compare the second paper size with the first paper size if the second paper size is entered by the input means. The first paper size is memorized in the storage means at the beginning. If these sizes are not equal to each other, the control means causes a display unit to indicate a message or sign such as "CHANGE PAPER SIZE" thereby urging a user to change a recording sheet. The recording unit is initially set to the first paper size setting and a recording sheet of first size is placed on the flap-type paper tray. Therefore, if the second paper size does not coincide with the first paper size, the recording sheet of the first size on the flap-type paper tray should be replaced with a recording sheet of the second size. The display unit indicates such a necessity.

The communication terminal device may further include a sensor for detecting changing of a recording sheet on the flap-type paper tray, and the controller may allow the recording unit to start the copy operation only when the sensor detects the changing of the recording sheet after the display unit indicates the PAPER SIZE CHANGE message or sign. The display unit may include LEDs which illuminate to inform the user of necessity of paper change.

The storage means may also store the second paper size as input by the input means. The control means may compare the second paper size with the first paper size upon completion of the copy operation, and cause the display unit to indicate a message or sign urging a user to change a recording sheet if the second paper size is not equal to the first paper size. Noticing this message, the user replaces the recording sheet of second paper size with that of first paper size. Accordingly, the communication terminal device is brought into a stand-by condition for printing of facsimile data (image) on a recording sheet upon completion of the copying.

It should be noted that any suitable element which extends outward from a body of the communication terminal device and allows a user to manually feed a recording sheet into the communication terminal device is employable instead of the flap-type paper tray.

DETAILED DESCRIPTION OF THE PREFERRED EMBODIMENTS

Now, a preferred embodiment of the present invention will be described with reference to the accompanying drawings.

In the following description, the present invention is embodied in a copier-facsimile system.

Figure 1:
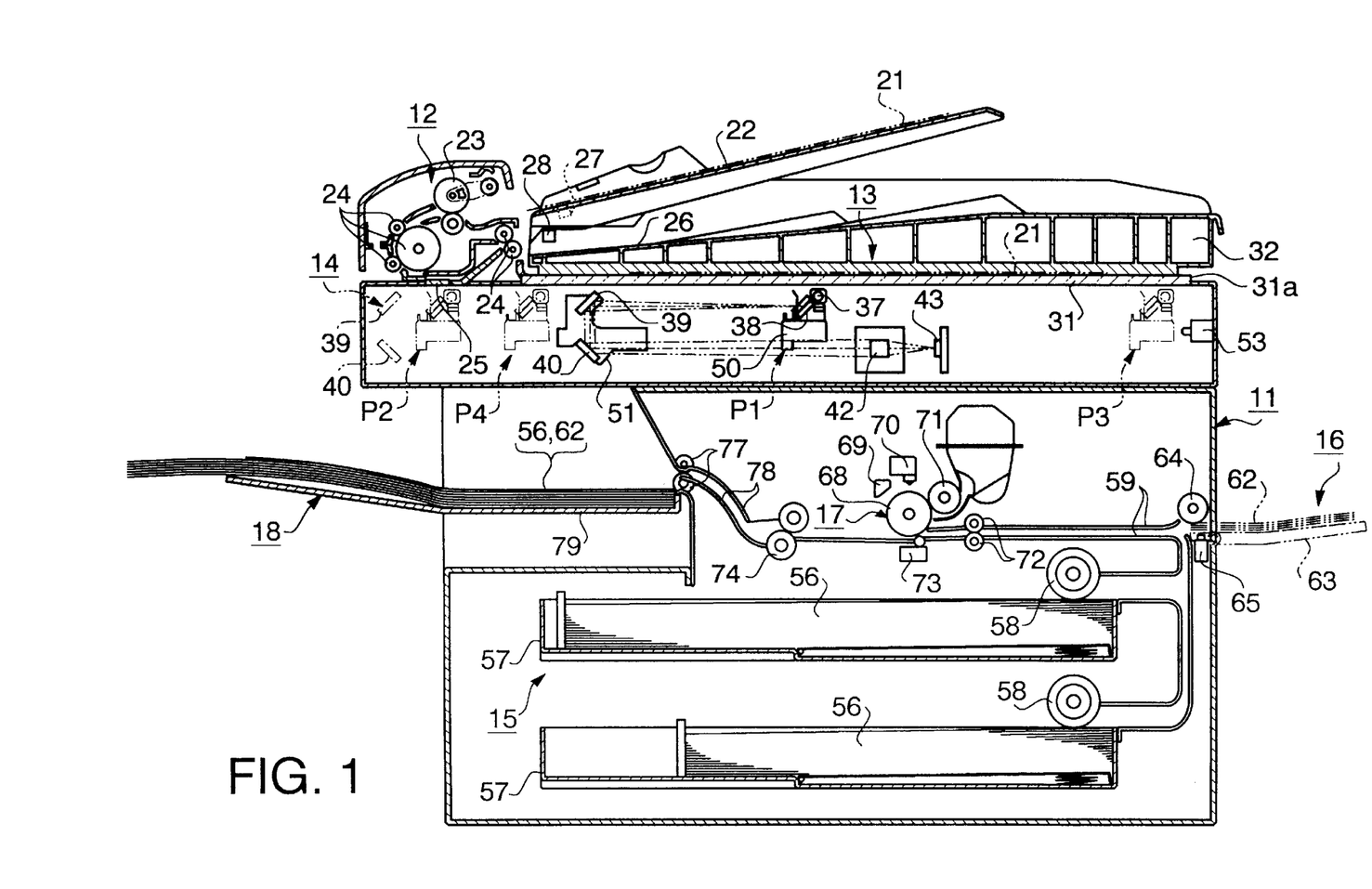
FIG. 1 illustrates a sectional view of a copier-facsimile combined system according to the present invention.

Referring to FIG. 1, a copier-facsimile system 11 includes a document feeding unit 12, a document table 13, a scanning unit 14, a cut paper feeder 15, a flap-type paper tray 16, a recording unit 17 and a discharged cut paper tray 18.

The document feeder unit 12 includes an inclined built-in paper tray 22 for placing documents 21, a separation roller 23 for feeding the documents 21 sheet by sheet, a plurality of feed roller 24 for transporting the document 21 along a predetermined path, a translucent plate 25 over which the document 21 passes, and a discharged document tray 26 for receiving discharged documents 21.

A document sensor 27 is provided in the paper tray 22 such that it faces the documents 21 on the paper tray 22 and outputs a detection signal if there is one or more documents 21 on the paper tray 22. A discharged document sensor 28 is provided on a back surface of the upper paper tray 22 such that it faces the discharged document tray 26 and outputs a detection signal when a document 21 is discharged onto the tray 26.

The document table unit 13 includes a transparent document plate 31 to place the document 21 thereon and a pivotable lid or cover 32 to be placed over the document plate 31. The document trays 22 and 26 of the document feeder unit 12 are mounted on the cover 32 of the document table unit 13 so that they move together with the cover 32 (they pivot about the same point as the cover 32). FIG. 1 illustrates the cover 32 placed on the document plate 31 (closed condition).

The scanning unit 14 includes a light source 37 for emitting a light to the document 21 passing over the translucent plate 25 or the document 21 stationarily placed on the scanning bed 31, first to third mirrors 38 to 40 for changing an optical path of a reflected light from the document 21, and a moving mechanism 41 for moving the light source 37 and first to third mirrors 38 to 40. The scanning unit 14 further includes a condensing lens 42 for condensing the light from the third mirror 40 and an image pick-up element (CCD) 43 for reading an image on the document 21 based on the light incoming through the condensing lens 42.

The moving mechanism 41 includes a pair of right and left large pulleys 44 and 45, a pair of right and left small pulleys 46 and 47, a first belt 48 engaged over the large pulleys 44 and 45, and a second belt 49 engaged over the small pulleys 46 and 47. The moving mechanism 41 also includes a first carriage 50 connected to the first belt 48, a second carriage 51 connected to the second belt 49, and a step motor 52.

The large pulley 44/45 has a diameter twice as large as the small pulley 46/47. The left large pulley 44 and small pulley 46 are coaxially united to each other and rotated together by the step motor 52. The first carriage 50 supports the light source 37 and first mirror 38, and the second carriage 51 supports the second and third mirrors 39 and 40.

As the pulleys 44 to 47 are rotated by the step motor 52, the first and second carriages 50 and 51 are moved via the first and second belts 48 and 49. The first carriage 50 moves at a speed twice as fast as the second carriage 51. The carriages 50 and 51 are selectively moved to an intermediate stand-by position P1, a first scanning position P2 under the translucent plate 25, or a second scanning start position P3 under the right end 31a of the scanning bed 31.

The document feeder unit 12 and scanning unit 14 constitute a means for automatically feeding a plurality of documents (ADF: Automatic Document Feeder). When the carriages 50 and 51 are in the first scanning position P2, the image on the document 21 passing over the translucent plate 25 is scanned. The document table unit 13 and scanning unit 14 constitute a flat bed scanner (FBS). While the carriages 50 and 51 are being moved to the scanning end position P4 from the second scanning start position P3, the image on the document 21 placed on the document plate 31 is scanned.

A carriage sensor 53 is positioned below the right end 31a of the document table 31 such that it outputs a detection signal when the carriages 50 and 51 are moved to the second scanning start position P3.

The cut paper feeding unit 15 includes two paper cassettes 57 for accommodating cut paper 56 of different sizes in a stack condition, paper feed rollers 58 for feeding the cut paper 56 sheet by sheet along a predetermined path toward the recording unit 17 from the cassettes 57, and guide plates 59 for guiding transportation of the cut paper 56. It should be noted that two paper cassettes 57 are illustrated, but only one or more than two paper cassettes may be provided.

The flap tray unit 16 includes a paper supporting plate 63 for holding sheets 62 thereon and a feed roller 64 for supplying the sheets 62 one by one from the supporting plate 63 toward the recording unit 17 via the upper guide plates 59. The sheets 62 are loaded on the supporting plate 63 by a user's hand. A sheet sensor 65 is provided below the feed roller 64 such that it faces the sheet 62 when the sheet is placed on the supporting plate 63. The sheet sensor 65 outputs a detection signal (ON signal) if there is one or more sheets 62 on the supporting plate 63 and an OFF signal when there is no recording sheet 62.

The recording unit 17 includes a photosensitive drum 68, an electric charger 69 for uniformly charging a surface of the photosensitive drum 68 to a predetermined voltage, an exposing unit 70 for forming an electrostatic latent image on the photosensitive drum 68, and a developing unit 71 for feeding a toner to the electrostatic latent image on the photosensitive drum 68 to develop the latent image in the form of toner image. The recording unit 17 also includes feed rollers 72 for feeding the cut paper 56 or sheet 62 to the photosensitive drum 68, a transfer unit 73 for transferring the toner image onto the cut paper 56 or sheet 62 from the photosensitive drum 68, and a fixer 74 for heating and fixing the toner image on the cut paper 56 or sheet 62.

The cut paper discharge unit 18 includes outlet rollers 77 for discharging the cut paper 56 or sheet 62 after recording, guide plates 78 for guiding movement of the paper 56 or sheet 62, and a discharged paper tray 79 for receiving the discharged paper 56 or sheet 62.

Figure 2:
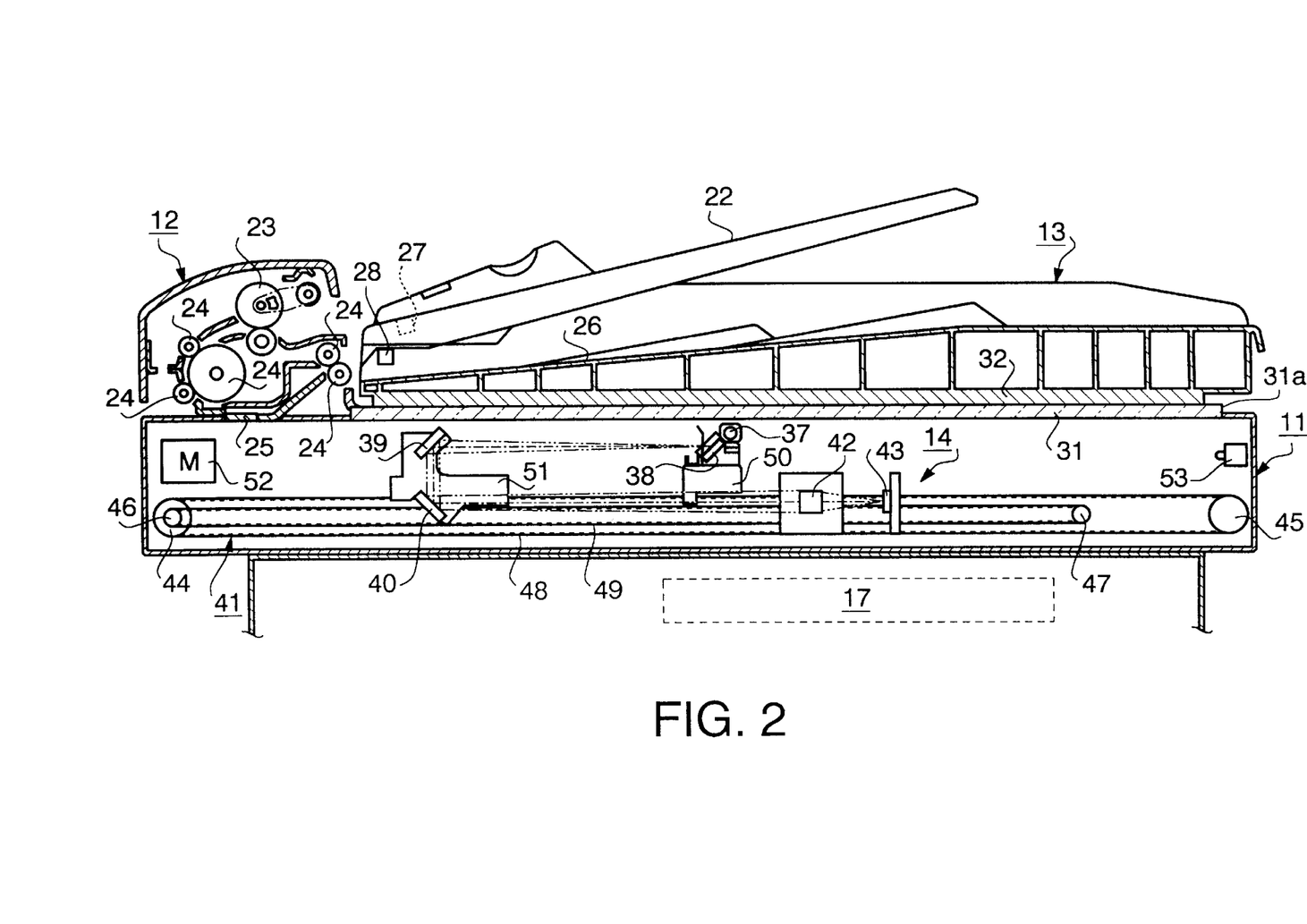
FIG. 2 illustrates an enlarged sectional view of the system shown in FIG. 1.

FIG. 2 illustrates an enlarged view of the document feeding unit 12, document table 13 and scanning unit 14 in cross section. The recording unit 17 is simply represented by the dotted line block in this illustration.

Figure 3:
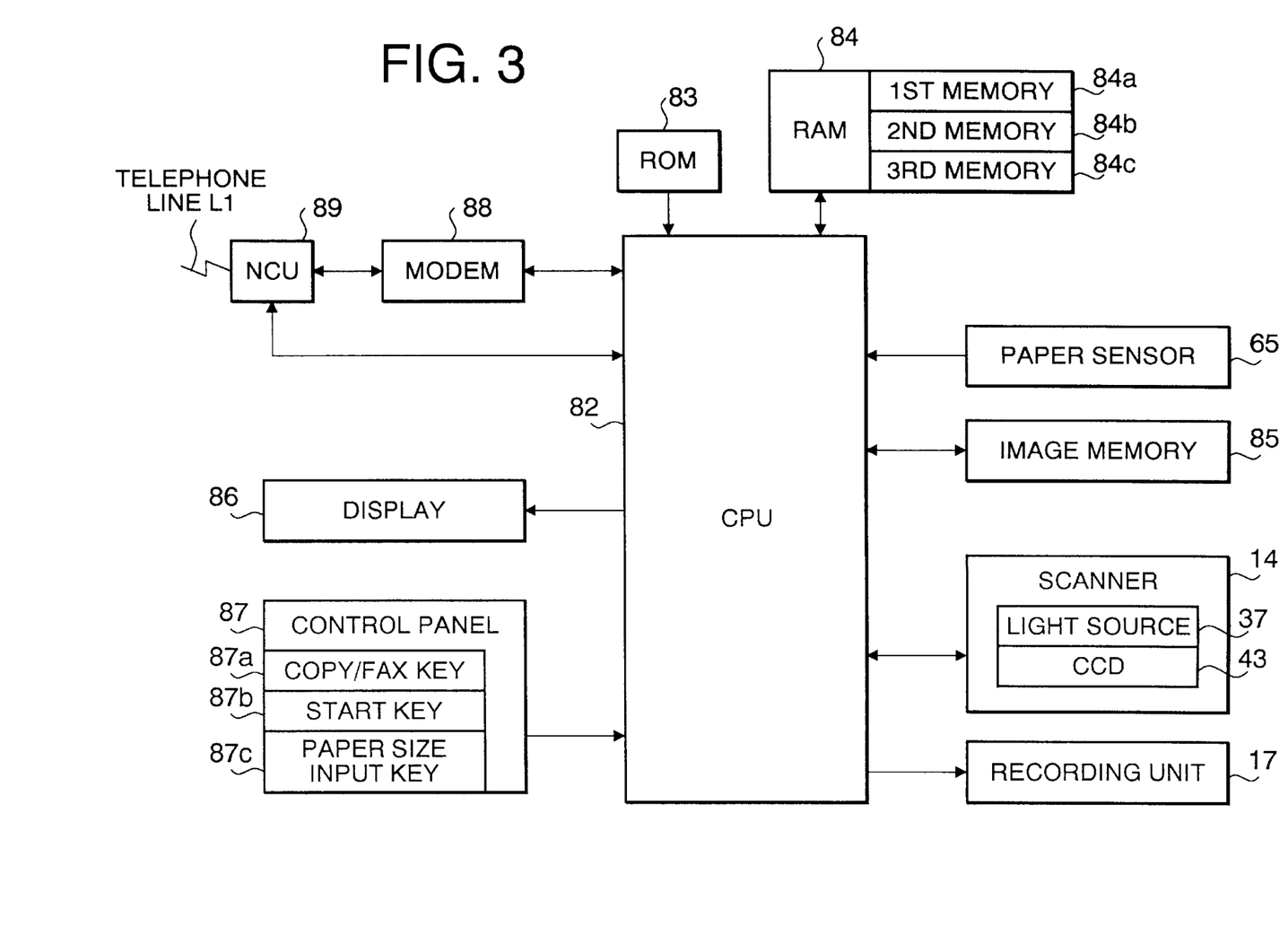
FIG. 3 is a circuit block diagram of the system shown in FIG. 1.

Now, a circuit configuration of the copier-facsimile system 11 of the invention having the above described structure will be described with reference to FIG. 3.

CPU 82 controls movements of various components of the system 11. ROM 83 stores control programs needed for CPU to function appropriately as a controller. RAM 84 temporarily stores data and the like as obtained during execution of the control programs. CPU 82, ROM 83 and RAM 84 constitute a control means.

RAM 84 constitutes a storage means. RAM 84 includes first to third memories 84a, 84b and 84c. The first memory 84a stores a size of a recording sheet 62 hand-loaded onto the flap-type paper tray 63 for reproducing of facsimile image data sent from a remote facsimile machine. The second memory 84b stores a size of a recording sheet 62 which is also manually placed on the flap-type paper tray 63 for making a copy. The third memory 84c stores a size of a recording sheet according to which the recording unit 17 operates when a recording sheet is supplied to the recording unit 17 from the flap-type paper tray 63. Data to be stored in the third memory 84c is supplied from the first or second memory 84a or 84b.

The land-loaded sheet sensor 65 outputs a detection signal to CPU 82. The scanning unit 14 scans an image on the original document 21 over the translucent plate 25 or scanning bed 31 and outputs a black and white binary image data to CPU 82. An image memory 85 temporarily stores image data sent from the remote facsimile machine or image data scanned from the original by the scanning unit 14. The recording unit 17 records the image data on the recording sheet 62 fed from the flap-type paper tray 63 or the cut paper 56 fed from the cassette 57.

A display 86 includes a liquid crystal display panel and/or LEDs and indicates various information about the operation mode of the system 11 such as "COPY MODE", "FAX MODE", "RECORDING SHEET CHANGED ?", "STAND-BY CONDITION" and "SYSTEM FAILURE". An control panel 87 includes various operation keys such as copy/fax key 87a, start key 87b and paper size input key 87c.

The copy/fax key 87a is pressed to selectively perform a copy operation or facsimile operation. The start key 87b is pressed to start the copy operation or facsimile operation. The paper size input key 87c is an input means. When the user receives facsimile data from a remote facsimile machine and wants to have the data printed on a recording sheet 62 by supplying the recording sheet 62 from the flap-type paper tray 16, the user inputs a size of the sheet 62 (first paper size for facsimile image printing) using the input key 87c. Likewise, when the user makes a copy of an original document by supplying a recording sheet 62 from the flap-type paper tray 16, the user also inputs the paper size of the sheet 62 (second paper size for copy) using the input key 87c. In this particular embodiment, the first paper size is input at the beginning, and the second paper size setting is automatically switched to the first paper setting after making a copy. Therefore, the user inputs the first paper size only once, i.e., at the initial system setting and inputs the second paper size every time the user wants to have a copy using the flap-type paper tray 16 (described hereinafter).

A modem 88 modulates and demodulates data to be transmitted to and received from a remote facsimile machine. NCU 89 controls connection and disconnection of a telephone line L1 with and from the system 11. NCU 89 also detects a dial pulse corresponding to a facsimile number of the remote facsimile. The dial pulse is sent to and received from the remote facsimile.

When the user enters the first paper size using the input key 87c, CPU 82 causes the first memory 84a of RAM 84 to store the input paper size. When the user wants to have a copy printed on the sheet 62 and enters the second paper size using the input key 87c, CPU 82 causes the second memory 84b to store the input paper size.

When the user wants to make a copy by supplying the recording sheet 62 from the flap-type paper tray 63 (e.g, when the user presses the first key 87a to change the mode from fax to copy and inputs the second paper size using the third key 87c), CPU 82 compares the paper size for copying with the paper size for facsimile data reproduction. If these sizes are not equal to each other (e.g., if the first paper size is A4 and the second paper size is B5), CPU 82 causes the display 86 to indicate a message such as "PAPER CHANGED ?", thereby urging the user to change the paper size. This is because the recording sheet of first size (A4) is placed on the flap-type paper tray when the recording sheet of second size (B5) should be placed on the tray instead. CPU 82 allows the recording unit 17 and associated components to start the copy operation only when it receives ON, OFF and ON signals sequentially from the recording sheet sensor 65 after displaying the message on the display 86 if the first and second paper sizes are not the same. A series of ON, OFF and ON signals indicate that the user has taken a recording sheet of first size from the tray 16 and substitutes it with a recording sheet of second size which is appropriate for copying. In other words, this series of signals indicate completion of paper size change.

CPU 82 compares the recording sheet size stored in the first memory 84a and that stored in the second memory 84b again when the copying is finished. If the former does not coincides with the latter, CPU 82 causes the display 86 to indicate the "PAPER CHANGED ?" message again. This is because the system 11 should prepare for facsimile data reception after copying. CPU 82 changes the paper size setting to that of the first memory 84a from that of the second memory 84b if it receives ON, OFF and ON signals sequentially from the recording sheet sensor 65 after displaying the paper change message. The series of ON, OFF and ON signals indicate completion of the paper size being switched back to A4 (fax size) from B5 (copy size). CPU 82 refers to the first memory 84a when returning the paper size setting to the initial setting.

Operations of the copier-facsimile system 11 executed when a copy of the original 21 is made by supplying a recording sheet 62 from the flap-type paper tray 16 will now be described with reference to a flowchart shown in FIG. 4. Tie flowchart proceeds under the control of CPU 82 based on the control program stored in ROM 83.

First, the user inputs a paper size for facsimile data reproduction (e.g., A4) using the paper size input key 87c of the control panel 87. Then, this paper size is stored in the first memory 84a of RAM 84 (S1). The paper size data in the first memory 84a is also stored in the third memory 84c (S2). The data in the third memory determines the operation of the recording unit 17. The A4 size recording sheet is loaded on the flap-type paper tray 16 at the beginning.

Then, it is determined whether the user pressed the copy/fax key 87a to select the copy mode using the flap-type paper tray 16 (S3). If the user does not select the copy mode, i.e., if the fax data reproduction mode is selected by the copy/fax key 87a, the recording unit operates according to the paper size data stored in the third memory 84c and the facsimile image data sent from a remote facsimile is printed on the sheet 62 (S4). Subsequent to this recording, the program proceeds to END.

On the other hand, if the copy mode using the flap-type paper tray 16 is selected at S3, the system awaits the entering of the paper size for copying by the user. When the user inputs this paper size using the input key 87c, the paper size data is stored in the second memory 84b of RAM 84 (S5). After that, the paper size data stored in the second memory 84b is compared with the paper size date stored in the first memory 84a (S6).

If these paper size data do not match, e.g., if the paper size stored in the first memory 84a is A4 and that stored in the second memory 84b is B5, the size of the original 21 (B5) and that of the recording sheet 62 (A4) do not match. In this case, the display 86 indicates a message which urges the user to change the size of the recording sheet 62 such as "PAPER CHANGED ?" (S7). Noticing this message, the user takes the A4 size recording sheet 62 from the flap-type paper tray 63 and inserts a B5 size recording sheet 62. Following this paper replacement, the user presses a YES key to send a confirmation signal to CPU 82 (S8). In the meantime, the paper sensor 65 outputs a series of ON, OFF and ON signals to CPU 82 as the user replaces the recording sheet 62 on the flap-type paper tray 63. If CPU receives this series of signals from the paper sensor 65 (S9), it determines that the recording sheet 62 has been switched to an appropriate size. When the user takes the A4 size recording sheet from the flap-type paper tray 63, the detection signal of the paper sensor 65 changes from ON to OFF. Subsequent to this, when a new recording sheet (B5 sheet) is placed on the flap-type paper tray 63, the detection signal of the paper sensor 65 changes from OFF to ON.

After S9, the paper size data in the second memory 84b is transferred to the third memory 84c (S10) so that the recording unit 17 operates according to the B5 size setting. Likewise, if the answer at S6 is YES, the program bypasses S7 to S9 and jumps to S10. After S10, the user places the original 21 on the document tray 22 of the document feeder unit 12 or the scanning table 31 and presses the start key 87b (S11). Then, the scanning unit 14 scans an image or picture on the original 21 and the recording unit 17 prints the image data on the B5 recording sheet 62 (S12).

When the copying on the recording sheet 62 is completed, it is determined again whether the paper size stored in the first memory 84a is equal to that stored in the second memory 84b (S13). If the answer at S6 is NO and the program reaches S12 via steps S7 to S9 (i.e., if the paper size in the first memory 84a is not equal to that in the second memory 84b), the display 86 indicates a message such as "PAPER CHANGED ?" again thereby urging the user to change the paper 62 (S14). This is because the system 11 should prepare for facsimile data reception after copying. Noticing this message, the user removes the B5 recording sheet (copy sheet) from the flap-type paper tray 63 and replaces it with an A4 recording sheet (facsimile data printing sheet) and presses YES key (S15) to send a confirmation signal to CPU 82. Meanwhile, CPU 82 receives a series of ON, OFF and ON signals from the paper sensor 65 (S16). As described above, this series of signals indicates completion of paper changing.

Upon confirming replacement of the recording sheet 62 to A4, the paper size data stored in the first memory 84a is automatically transferred to the third memory 84c (S17). Likewise, if the answer at S13 is YES, the program bypasses S14 to S16 and advances to S17. As a result, the system 11 is now ready for reception of facsimile image data or it is brought into a stand-by condition (S18).

The illustrated embodiment has the following advantages:

(1) The recording paper size for facsimile data reproduction is first entered by using the paper size input key 87c and stored in the first memory 84a of RAM 84. After that, if the user enters a different paper size for copying and makes a copy of the original document 21 using the flap tray unit 16, CPU 82 automatically returns the paper size setting to the initial condition after copying (S12→S17). In other words, the recording paper size setting of the recording unit 17 is changed to the paper size stored in the first memory 84a after the copy operation is finished under the control of CPU 82. Therefore, the user does not need to re-input the paper size for facsimile data reproduction every time the user makes a copy using the flap-type paper tray unit 16. Conventionally, re-inputting of the paper size is required every time the user makes a copy on the recording sheet 62 as long as the paper size for facsimile data reproduction is not equal to that for copying. If the user forgets reentering the paper size after copying, the facsimile data reception may be disabled. The present invention can eliminate such a possibility.

(2) When the user inputs the paper size for copying using the input key 87c, CPU 82 compares this paper size with the paper size for facsimile data reproduction. If these sizes do not coincide with each other, the display 86 prompts the user to change the paper. In other words, if the user makes a copy using a paper size different from the facsimile data reproduction, the system 11 informs the user of necessity of paper change. Accordingly, it is possible to prevent that a copying is conducted onto an inappropriate size of recording sheet.

(3) The display 86 indicates a paper change message. However, the user might not see this message and might not replace the recording sheet 62 on the flap-type paper tray 63. In this case, CPU 82 does not allow the recording unit 17 to perform the copying operation. The recording unit 17 is caused to make a copy only when CPU 82 receives a particular series of signals from the paper sensor 87c which indicates switching of the recording sheet. Thus, copying on the recording sheet 62 is always carried out on an appropriately sized sheet of paper.

The present invention is not limited to the above described embodiment, but various changes and modifications may be made without departing from the spirit and scope of the invention.

Figure 4:
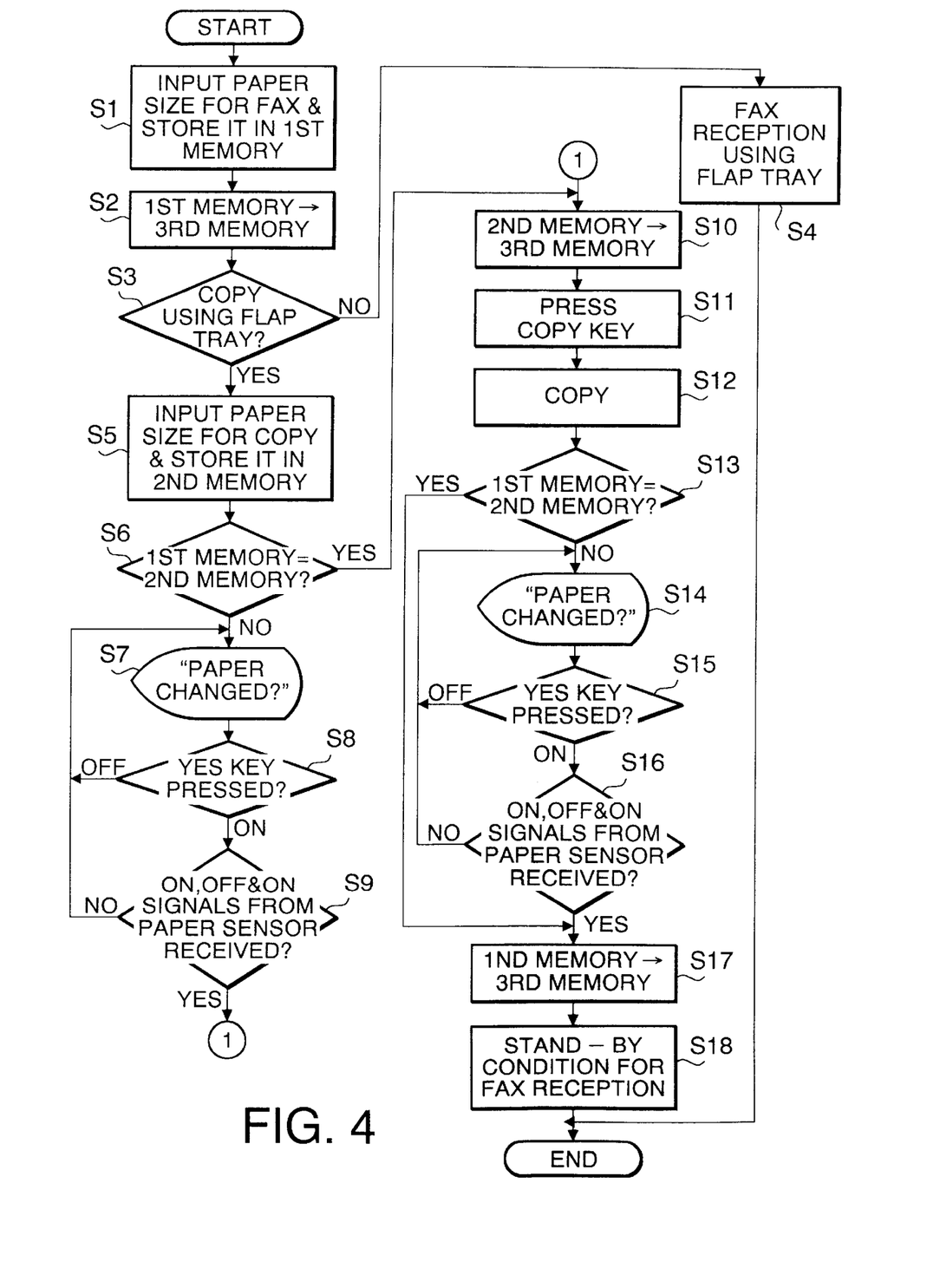
FIG. 4 is a flowchart when the copier-facsimile system makes a copy on a recording sheet supplied from a flap-type paper tray.
Figure 5:
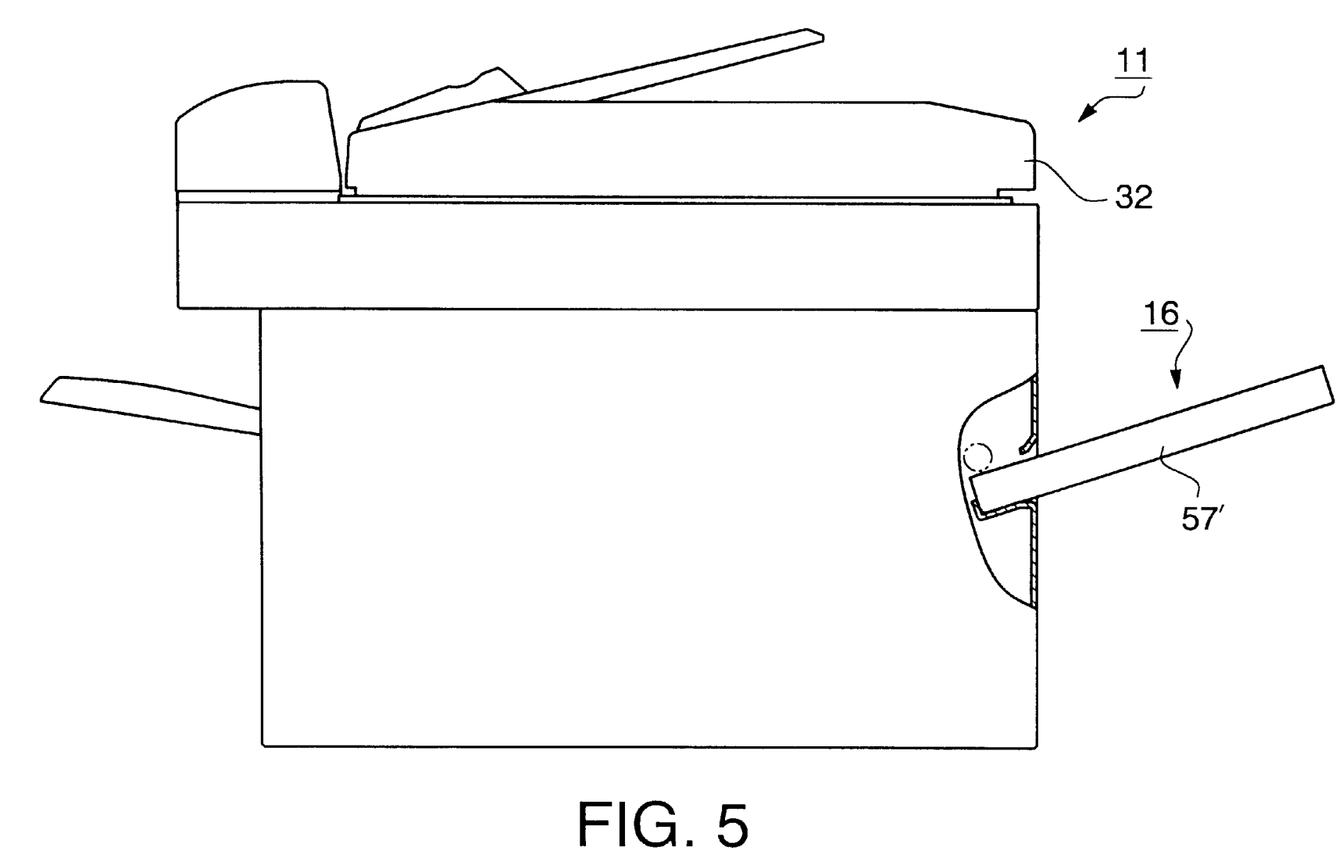
FIG. 5 schematically illustrates another copier-facsimile system.

For example, the determination steps of S8 and S15 in the flowchart shown in FIG. 4 may be dispensed with. CPU 82 may determine the substitution of the recording sheet by the determination steps of S9 and S16 only. The message "PAPER CHANGED ?" is displayed in the display unit 86 at S7 and S14, but other messages or particular signs or symbols may be displayed instead, or a certain sound may be made. The paper cassettes may not be incorporated in a body of the facsimile-copier system 11, but they may partly extend from the lateral wall of the body of the facsimile-copier system such that an upper surface of the upper-most paper cassette 57' may define a flap-type paper tray 16 as illustrated in FIG. 5.

What is claimed is:

1. A communications terminal device of a type having a communication function and a copy function comprising:
    a recording unit for making a copy of an original or reproducing facsimile image data sent from a remote facsimile on a recording sheet supplied to the recording unit;
    a paper tray extending outward from a body of the communication terminal device in its use condition to allow manual feed of a recording sheet to the recording unit therefrom;
    input means for inputting a first size of the recording sheet to be fed to the recording unit from the paper tray for reproducing facsimile image data and a second size of the recording sheet to be fed to the recording unit from the paper tray for making a copy, the recording unit being adapted to operate according to a paper size entered by the input means if the recording sheet is supplied to the recording unit from the paper tray, the recording unit being set to operate according to the first size at the beginning;
    storage means for storing the first size as input by the input means;
    control means for changing the recording sheet size setting of the recording unit to the first paper size from the second paper size after completion of a copy operation if the copy operation has been carried out using the paper tray; and
    a display unit;
    wherein the control means compares the second paper size with the first paper size stored in the storage means upon inputting of the second paper size by the input means, and the control means causes the display unit to indicate a message or sign urging a user to change a recording sheet before the copy operation if the second paper size is not equal to the first paper size.

2. The communication terminal device as defined in claim 1 further including a sensor for detecting changing of the recording sheet on the paper tray, and wherein the control means allows the recording unit to start the copy operation only when the sensor detects the changing of the recording sheet after the display unit indicates the message or sign.

3. The communication terminal device as defined in claim 2, wherein the control means causes the storage means to also store the second paper size as input by the input means, compares the second paper size with the first paper size upon completion of the copy operation, and causes the display unit to indicate a message or sign urging a user to change a recording sheet if the second paper size is not equal to the first paper size.

4. The communication terminal device as defined in claim 3, wherein the control means changes the paper size setting from the second size to the first size when the sensor detects the changing of the recording sheet after the display unit indicates the message or sign upon completion of the copy operation.

5. The communication terminal device as defined in claim 4, wherein the sensor is a sensor for detecting presence and absence of the recording sheet on the paper tray, and the control means changes the paper size setting when it receives ON, OFF and ON signals from the sensor.

6. The communication terminal device as defined in claim 2, wherein the sensor is a sensor for detecting presence and absence of the recording sheet on the paper tray, and the control means allows the recording unit to start the copy operation when it receives ON, OFF and ON signals from the sensor.

7. The communication terminal device as defined in claim 2, wherein the control means causes the storage means to also store the second paper size as input by the input means, compares the second paper size with the first paper size upon completion of the copy operation, and causes the display unit to indicate a message or sign urging a user to change a recording sheet if the second paper size is not equal to the first paper size.

8. The communication terminal device as defined in claim 7 further including a sensor for detecting changing of the recording sheet on the paper tray, and wherein the control means changes the paper size setting from the second size to the first size when the sensor detects the changing of the recording sheet after the display unit indicates the message or sign upon completion of the copy operation.

9. The communication terminal device as defined in claim 8, wherein the sensor is a sensor for detecting presence and absence of the recording sheet on the paper tray, and the control means changes the paper size setting when it receives ON, OFF and ON signals from the sensor.

10. The communication terminal device as defined in claim 1 further including at least one paper cassette for stacking one or more recording sheets.

11. The communication terminal device as defined in claim 10, wherein the at least one paper cassette projects outwardly from a main body of the communication terminal device to form the paper tray.

12. The communication terminal device as defined in claim 10, wherein the at least one paper cassette is entirely housed in a main body of the communication terminal device.

13. The communication terminal device as defined in claim 1, wherein the communication terminal device is a copier-facsimile device.

14. The communication terminal device as defined in claim 1, wherein the paper tray is a flap-type paper tray.

15. The communication terminal device as defined in claim 1, wherein the paper tray is retractable.

16. A communication terminal device of a type having a communication function and a copy function comprising:
    a recording unit for making a copy of an original or reproducing facsimile image data sent from a remote facsimile on a recording sheet supplied to the recording unit;
    a paper tray extending outward from a body of the communication terminal device in its use condition to allow manual feed of a recording sheet to the recording unit therefrom;
    input means for inputting a first size of the recording sheet to be fed to the recording unit from the paper tray for reproducing facsimile image data and a second size of the recording sheet to be fed to the recording unit from the paper tray for making a copy, the recording unit being adapted to operate according to a paper size entered by the input means if the recording sheet is supplied to the recording unit from the paper tray, the recording unit being set to operate according to the first size at the beginning;
    storage means for storing the first size as input by the input means;
    control means for changing the recording sheet size setting of the recording unit to the first paper size from the second paper size after completion of a copy operation if the copy operation has been carried out using the paper tray; and a display unit, wherein the control means causes the storage means to also store the second paper size as input by the input means, compares the second paper size with the first paper size upon completion of the copy operation, and causes the display unit to indicate a message or sign urging a user to change a recording sheet if the second paper size is not equal to the first paper size.

17. The communication terminal device as defined in claim 16 further including a sensor for detecting changing of the recording sheet on the paper tray, and wherein the control means changes the paper size setting from the second size to the first size when the sensor detects the changing of the recording sheet after the display unit indicates the message or sign.

18. The communication terminal device as defined in claim 17, wherein the sensor is a sensor for detecting presence and absence of the recording sheet on the paper tray, and the control means changes the paper size setting when it receives ON, OFF and ON signals from the sensor.

* * * * *